(12) United States Patent
Bergmann et al.

(10) Patent No.: US 12,492,743 B2
(45) Date of Patent: Dec. 9, 2025

(54) DIFFERENTIAL BEVEL GEAR, BEVEL GEAR DIFFERENTIAL AND METHOD FOR PRODUCING A DIFFERENTIAL BEVEL GEAR USING FORMING TECHNOLOGY

(71) Applicant: HIRSCHVOGEL HOLDING GMBH, Denklingen (DE)

(72) Inventors: Jacqueline Bergmann, Dirlewang (DE); Uwe Alexander Rütjes, Wessobrunn (DE)

(73) Assignee: Hirschvogel Holding GmbH, Denklingen (DE)

( * ) Notice: Subject to any disclaimer, the term of this patent is extended or adjusted under 35 U.S.C. 154(b) by 0 days.

(21) Appl. No.: 18/749,795

(22) Filed: Jun. 21, 2024

(65) Prior Publication Data

US 2025/0003474 A1    Jan. 2, 2025

(30) Foreign Application Priority Data

Jun. 29, 2023    (DE) .......................... 102023117249.2

(51) Int. Cl.
  *F16H 55/08*    (2006.01)
  *B21K 1/30*    (2006.01)
  (Continued)

(52) U.S. Cl.
  CPC ........... *F16H 55/0846* (2013.01); *B21K 1/30* (2013.01); *F16H 48/08* (2013.01); *F16H 48/38* (2013.01);
  (Continued)

(58) Field of Classification Search
  CPC .... F16H 1/14; F16H 55/0846; F16H 55/0813; F16H 55/08; F16H 55/20; F16H 2048/382; Y10T 74/19958
  See application file for complete search history.

(56) References Cited

U.S. PATENT DOCUMENTS 4,754,661 A * 7/1988 Barnett ................... F16H 48/28
                                              475/236
4,761,867 A * 8/1988 Vollmer ................. F16H 48/08
                                              29/893.3

(Continued)

FOREIGN PATENT DOCUMENTS

CN      206036178 U  *  3/2017
DE    112011102802 T5     6/2013
(Continued)

OTHER PUBLICATIONS

"Basic Gear Terminology and Calculation" retrieved from https://khkgears.net/new/gear_knowledge/abcs_of_gears-b/basic_gear_terminology_calculation.html (Year: 2025).*

(Continued)

*Primary Examiner* — Stacey A Fluhart
(74) *Attorney, Agent, or Firm* — BROOKS KUSHMAN P.C.

(57) ABSTRACT

A first differential bevel gear or equalizing bevel gear, suitable for a bevel gear differential in a vehicle, having a cone-shaped toothed section with external toothing having a plurality of teeth having a head height coefficient of at least 1.1. The bevel gear differential may further include a second differential bevel gear mating with the equalizing bevel gear and molded as an axle shaft gear, wherein teeth of the axle shaft gear have a head height coefficient of at least 1.2, and wherein a total coverage of the equalizing bevel gear and axle shaft gear is in the range of 1.5 to 2.0. Furthermore, a manufacturing method for the differential bevel gear is disclosed.

14 Claims, 4 Drawing Sheets

(51) Int. Cl.
*F16H 48/08* (2006.01)
*F16H 48/38* (2012.01)
*F16H 55/17* (2006.01)

(52) U.S. Cl.
CPC ....... *F16H 55/17* (2013.01); *F16H 2048/382* (2013.01)

(56) References Cited

U.S. PATENT DOCUMENTS

| | | | |
|---|---|---|---|
| 4,825,715 A | 5/1989 | Buczek et al. | |
| 11,555,225 B2 * | 1/2023 | Powers | .......... C21D 1/10 |
| 12,017,292 B2 * | 6/2024 | Noguchi | .......... B24C 11/00 |
| 2011/0103993 A1 * | 5/2011 | Morselli | .......... F04C 2/14 |
| | | | 418/206.1 |
| 2012/0048048 A1 * | 3/2012 | Benedict | .......... F16H 55/17 |
| | | | 83/869 |
| 2012/0227389 A1 * | 9/2012 | Hinderks | .......... F02B 75/002 |
| | | | 60/317 |
| 2018/0003283 A1 * | 1/2018 | James | .......... G06F 30/17 |
| 2024/0077136 A1 * | 3/2024 | Nomura | .......... F16H 1/14 |

FOREIGN PATENT DOCUMENTS

| | | | | |
|---|---|---|---|---|
| DE | 112013001110 T5 * | 11/2014 | ............. | F16H 3/663 |
| DE | 102016102946 A1 * | 8/2016 | ............. | B23F 21/00 |
| EP | 2484474 A1 | 8/2012 | | |
| EP | 2580493 B1 | 12/2014 | | |
| RU | 2748001 C1 * | 5/2021 | ............. | F16H 55/08 |

OTHER PUBLICATIONS

G. Niemann et al., "Maschinenelemente (Machine Elements)", ISBN 978-3-642-62101-7—Springer-Verlag Berlin Heidelberg, 1983 (Reprint 2004) pp. 27-33. Machine translation included.

* cited by examiner

DIFFERENTIAL BEVEL GEAR, BEVEL GEAR DIFFERENTIAL AND METHOD FOR PRODUCING A DIFFERENTIAL BEVEL GEAR USING FORMING TECHNOLOGY

CROSS-REFERENCE TO RELATED APPLICATIONS

This application claims priority to German application No. 10 2023 117 249.2 filed Jun. 29, 2023, the disclosure of which is hereby incorporated in its entirety by reference herein.

TECHNICAL FIELD

The present disclosure relates to a differential bevel gear, a bevel gear differential with at least two differential bevel gears, and a method for manufacturing a differential bevel gear. Here, the tooth geometry is particularly optimized to improve the load capacity and efficiency of the differential bevel gear.

BACKGROUND

There are numerous toothed gear transmissions in mechanical engineering. Specifically, there are spur gear transmissions and bevel gear transmissions. The toothed gear transmissions all have two toothed gears that rotate around a respective axle of rotation, wherein the toothed gears engage by their teeth with tooth flanks through which the toothed gears act on each other. In this case, each tooth of the toothed gears is thus in operative contact with a tooth of the other toothed gear only for part of the rotation of the corresponding toothed gear. Compared to spur gear transmissions, bevel gear transmissions have a significantly more complex rolling geometry. Bevel gear transmissions are generally characterized by two intersecting rotational axes (unlike hypoid bevel gears, for example). Both contact points of a pair of contact points each define a circle in a bevel gear transmission just as in a spur gear transmission, the difference being that they do not lie in the same plane in a bevel gear transmission. However, the constant (and equal) distance of both contact points to the point of intersection of the two axes of rotation causes both circles to lie on a common spherical surface. Thus, analogous to spur gear transmissions, the rolling can be regarded as independent of the tooth width on the spherical surface.

Differential bevel gears are important components in many applications, such as in the automotive industry and in the aviation and aerospace industry. The efficiency and reliability of a differential bevel gear are dependent on many factors including the geometry of the teeth, the head height coefficient, and the coverage.

The head height coefficient or factor is an important parameter for calculating the tooth form of toothed gears. The head height coefficient or factor is defined as the ratio between the head height of the teeth and the pitch of the toothed gear. A large head height leads to a greater load capacity of the toothed gear, yet also causes higher loads and wear on the teeth. A typical head height for differential bevel gears is around 0.3 to 0.5 of the pitch. Here also the head height coefficient is used. The head height is determined in relation to the module. Typical values are around 0.9 to 1.0. A further important parameter in the construction of differential bevel gears is the coverage. This defines the degree of spatial coverage between the tooth flanks of two toothed gears which are used in a differential gear transmission. A higher coverage leads to better load distribution and increases the load capacity; however, it can also lead to higher friction losses and more intense noise development. The latter is related indirectly and usually an attempt is made to improve the coverage to make the toothing more robust against noise development. The optimum coverage depends on several factors including the tooth geometry and the operating conditions.

EP 2 484 474 A1 discloses a determination method for geometry data of a first bevel gear of a bevel gear transmission and bevel gear transmission having a first bevel gear and a second bevel gear. EP 2 580 493 B1 discloses a bevel gear toothing with optimized load capacity.

SUMMARY

The object of the present disclosure is to provide an innovative generic tooth geometry, which is improved or at least represents an alternative embodiment, for increasing performance and reliability of differential bevel gears. The proposed solution can be used in a wide range of applications using differential bevel gears. Specifically, the aim is to address the extra challenges faced by electric vehicles, for example through energy recovery.

The object is achieved by the subject matter of the independent claims. Advantageous further embodiments are disclosed in the dependent claims, the description, and the accompanying figures. In particular, the independent claims of a set of claims may also be further structured analogously to the dependent claims of another set of claims.

BRIEF DESCRIPTION OF THE DRAWINGS

The main idea of the disclosure will be described in more detail below with reference to the figures. It should be noted that the following description is only exemplary. The protection scope of the disclosure is determined by the subject matter of the claims. In the following, advantageous embodiments of the disclosure are described with reference to the accompanying figures. In this case, the same reference numerals are used for identical or equivalent elements. Moreover, for an easier readability and better understanding, reference signs are also used for features when these are not shown in the figure described. Also, in similar figures, not all reference symbols are always shown if these features have already been clearly identified in the previous figures. In the figures:

DETAILED DESCRIPTION

Figure 1:
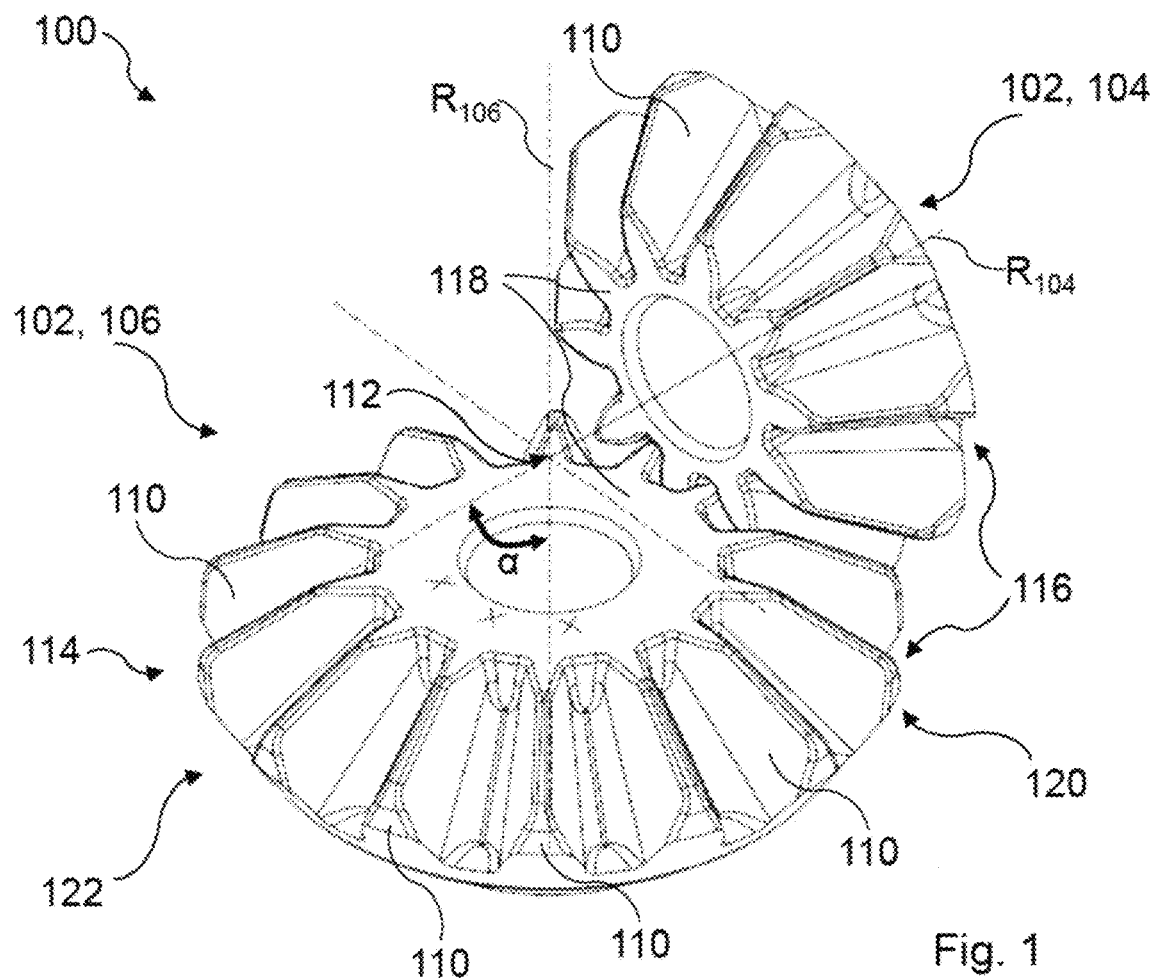
FIG. 1 a spatial view of a bevel gear differential with two differential bevel gears according to an embodiment of the present disclosure.

A differential bevel gear disclosed herein may have a cone-shaped toothing section. An external toothing with a plurality of teeth is provided on the toothing section. The teeth have a head height coefficient of at least 1.1. More specifically, the differential bevel gear is intended for a bevel gear differential in a vehicle.

The differential bevel gear may generally be referred to as a bevel gear. The axes of the differential bevel gear are not parallel but intersect. The angle of intersection can be 90°. The basic shape is a truncated cone with a toothed lateral surface. This means that a plurality of teeth is formed on the lateral surface, the extent of which may be referred to as a toothed section. The toothed section is arranged on the lateral surface. When two differential bevel gears are paired with each other, their tips (i.e., the tips of the intended cone) are coincident. The teeth can extend in a straight line in the direction of the lateral lines. The differential bevel gear can have straight teeth, i.e., the flank lines of the crown toothing are straight lines passing through the crown gear center. Thus, the differential bevel gear can also be referred to as a straight-toothed bevel gear. The differential bevel gear can have octoid teeth. Contrary to the involute which defines the tooth height profile of spur gears, when the octoid is concerned, its line of pressure represents a portion of an octoid (which would appear in full length as an 8-shaped curve on an imaginary spherical surface) rather than the tooth height profile of a bevel gear. The tooth height profile of the differential bevel gear is based on an octoid of 1st or 2nd order or a spherical involute. The term "octoid" refers to the shape of the line of pressure (E) on the spherical lateral surface of the bevel gear pairing, which resembles an eight-shaped curve (octoid).

This leads to a specific improvement in flank safety and profile coverage due to toothing parameters that have been non-standard up to now. As a result, higher running performance with greater torques, an improvement in energy recovery, and a longer service life in general can be achieved, especially for electric mobility vehicles.

The head height coefficient may be at least 1.15. Especially the head height coefficient may be at least 1.20 or particularly 1.25. The head height coefficient may be no more than 1.9. The head height coefficient may be in a range between 1.1 and 1.9. The maximum value of the head height coefficient may particularly be 1.6. Especially the maximum head height coefficient may be 1.5 or particularly 1.4. In one embodiment, the head height coefficient may be in a range between 1.20 or particularly 1.25 at the bottom and 1.5 or particularly 1.4.

The differential bevel gear may have a pressure angle in a range between 17° and 24°. Especially the differential bevel gear may have a pressure angle of at least 19°, particularly 21°, or particularly 22°. In particular, the differential bevel gear may have a pressure angle of no more than 23°. The pressure angle of the differential bevel gear may be particularly in a range between 22° and 23°.

The differential bevel gear may have a profile shift coefficient between 0.1 and 0.3. In particular, the differential bevel gear may have a profile shift coefficient between 0.15 and 0.3, more particularly between 0.19 and 0.3. In one embodiment, the differential bevel gear may have a profile shift coefficient particularly between 0.195 and 0.25.

The differential bevel gear may have a foot height coefficient in a range from 1.1 to 2.0, especially wherein the foot height coefficient is greater than the head height coefficient.

The differential bevel gear may be manufactured in a forming process, especially without post-machining of the toothing. Further details of the differential bevel gear are given below in which it may be manufactured in a hot forming process and/or a semi-hot forming process and/or a cold forming process.

The spherical involute of the tooth height profile may be modified in the profile direction and/or width direction.

According to the disclosure, a bevel gear differential for a vehicle includes a differential bevel gear molded as an equalizing bevel gear as well as a differential bevel gear which mates with the equalizing bevel gear and which is molded as an axle shaft gear, wherein the total coverage of the equalizing bevel gear and axle shaft gear is in the range of 1.5 to 2.0. The equalizing bevel gear and the axle shaft gear are each a differential bevel gear according to a variant of a previously described differential bevel gear. The equalizing bevel gear has external toothing whose teeth have a head height coefficient of at least 1.1. The teeth of the axle shaft gear have a head height coefficient of at least 1.2, particularly at least 1.25.

The term bevel gear differential can be used to refer to a bevel gear differential transmission, a bevel gear transmission, a differential gear transmission, an equalizing gear transmission or in short, a differential, or a bevel gear rolling transmission, in which teeth roll and slide. The equalizing bevel gear may also be referred to as an equalizing toothed gear. The axle shaft gear can also be referred to as a bevel toothed gear. The bevel gear differential may be coupled to one drive and two outputs (transfer case). A bevel gear differential can have a differential cage, in which two, three, or four equalizing bevel gears may be mounted. The axle shaft gears of the driven axle may be in contact with these.

The first differential bevel gear may have a plurality of first teeth and may rotate in operation with a first rotational speed about a first axle of rotation, where the second differential bevel gear may have a plurality of second teeth and rotate in operation with a second rotational speed about a second axle of rotation. The two axles of rotation intersect to form an angle of intersection at an axle intersection point, where the two differential bevel gears interact with each other via the first tooth flanks of the first teeth and the second tooth flanks of the second teeth.

The bevel gear differential may have at least four differential bevel gears. Inside a circumferential gear carrier (also known as a retainer or cage), the bevel gear differential may be designed symmetrically: A differential bevel gear connected to the driven shafts can be arranged opposite to each other. The cage can have several differential bevel gears (generally two) that mate with the driven differential bevel gears along the circumference.

When the bevel gear differential is used on a driven axle of a motor vehicle, it may be referred to as an axle differential. The axle differential may equalize the rotational speeds between the two gears. When the vehicle is traveling straight ahead, the two smaller toothed gears in the gap of the axle do not rotate, but instead rotate with the large, toothed gear so that their effect is neutral. However, when the vehicle is driving around a bend, they rotate in opposing directions around their axes, so that the gear on the outer radius is driven somewhat faster and the other one somewhat slower. In vehicles where all gears are driven (all-wheel drive), further transfer cases are required: firstly, an axle differential per further driven axle, plus central differential, or longitudinal differentials to distribute the motor drive to several of the axle. A vehicle with four-wheel drive has two axle differentials and a center differential.

The total coverage of the equalizing bevel gear and axle shaft gear may be in a range from 1.6 to 1.9, particularly greater than 1.65.

The total coverage of the equalizing bevel gear and axle shaft gear when subjected to load may be in a range from 1.55 to 1.9, particularly greater than 1.65. The total coverage of the equalizing bevel gear and axle shaft gear when subjected to load may be in a range from 1.6 to 1.9, particularly greater than 1.7.

The equalizing bevel gear may have a profile shift coefficient between 0.1 and 0.3, particularly between 0.15 and 0.3, particularly between 0.19 and 0.3, particularly a profile shift coefficient between 0.195 and 0.25. Additionally, the axle shaft gear can have a negative profile shift coefficient.

A method for the production of a differential bevel gear using forming technology, particularly suitable for a bevel gear differential in a vehicle, may have at least a providing step, a heating step, a bulk forming step, and a cooling step. In the step of providing, a preform is provided. The preform can especially be a section of round material. In the heating step, the preform is heated (especially inductively) to a temperature between 650° C. and 1250° C. In the step of bulk forming, the heated preform is formed into a differential bevel gear according to a variant described above. The bulk formed differential bevel gear, which is especially intended for a bevel gear differential in a vehicle, has a cone-shaped toothing section on which an external toothing with a plurality of teeth is provided, where teeth of the differential bevel gear have a head height coefficient of at least 1.1. In the step of cooling, the differential bevel gear is cooled down.

The term bulk forming refers to a forming process in which a 3-dimensional material flow is generated and different wall thicknesses in the workpiece can be realized. The term bulk forming can be understood to mean particularly die forming. The bulk forming can especially be a hot forming and additionally or alternatively a warm forging (at 700° C.-980° C., particularly at 750° C.-950° C.) and additionally or alternatively a cold forming. Thus, for example, hot forming can be combined with a warm forging or a cold forming procedure. In an alternative embodiment, the step of bulk forming may exclusively include warm forging. The step of bulk forming can be conducted on a multi-stage press. The term bulk forming refers to flow pressing, a special type of bulk forming without burrs. The term cold flow pressing refers to a flow pressing in which the workpiece has approximately room temperature before forming begins, i.e., it is not heated before the forming process.

In the step of heating, the preform may be heated to a temperature below 1000° C., particularly below 980° C., particularly below 950° C. The step of bulk forming may be conducted below the recrystallization. Particularly when using steel, the step of bulk forming may be conducted below the austenite transformation temperature.

In the step of cooling, the differential bevel gear may be cooled on a regulated basis, especially in an air flow. Alternatively, the differential bevel gear may be quenched from the forging heat.

After the step of bulk forming, the differential bevel gear may be sandblasted, especially with steel grit, and additionally or alternatively, after the step of bulk forming (or after the step of sandblasting), a subsequent step of forming may be performed, in which the differential bevel gear is calibrated. The further step of forming can be a cold forming step.

Until now, the head height coefficient of the axle shaft gear was used below a value of 1.0 with a simultaneous pressure angle in the range of 24° to 26°. These parameters were chosen to guarantee production by forging, to optimize tooth foot safety, as well as to prevent the head of the axle shaft gear from engaging below the base circle of the equalizing gear. The mobility transition to electrified drives requires the optimization of flank safety. This means that it should be possible to achieve the largest possible profile coverage with the design. To this end, the head height coefficient of the axle shaft gear was significantly increased and the pressure angle was reduced. Thanks to the combination of these factors in an area that has not yet been used, it has been possible to significantly increase the durability of the bevel gears, wherein the workpiece can still continue to be manufactured by forming. In addition to this, further optimizations are applied to optimize the real occurring pressures and loads. This involves a deliberate design optimization of the tooth foot, as well as the reduction of flank pressures because of the optimized application of necessary modifications.

FIG. 1 shows a spatial view of a bevel gear differential (100) with two differential bevel gears (102). The differential bevel gears (102) of the bevel gear differential (100) are equal in various respects. Herein, the first differential bevel gear (102) is referred to as equalizing bevel gear (104) and the second differential bevel gear (102) is referred to as axle shaft gear (106) so that the two differential bevel gears (102) can be distinguished. The first differential bevel gear (102) is thus an equalizing bevel gear (104), and the second differential bevel gear is an axle shaft gear (106). The bevel gear differential (100) is a bevel gear transmission of which the differential bevel gears (102) respectively rotate about their separate axles of rotation ($R_{104}$, $R_{106}$). The two axles of rotation ($R_{104}$, $R_{106}$) intersect at a mutual point of intersection (112). In the embodiment example shown in FIG. 1, both axles of rotation ($R_{104}$, $R_{106}$) intersect at an angle of intersection a of 90°. Both differential bevel gears (102) have a plurality of teeth (108) with tooth flanks (110). The differential bevel gears (102) interact with each other via the tooth flanks (110), or otherwise stated, the differential bevel gears (102) transmit the generated torque. Each single tooth (108) of both differential bevel gears (102) is in operative contact with a tooth (108) of the other differential bevel gear (102) through the respective tooth flanks (110) only for a part of the rotation of the corresponding differential bevel gear (102). This is clearly illustrated again in the schematic diagrams in FIG. 5 and FIG. 7. A movement of both contact points of a pair of contact points of the two mutually mating differential bevel gears (102) each defines a circle, wherein the two circles lie on a sphere rather than in a plane, since both contact points have an equal and constant distance to the point of intersection (112). In this way, the rolling of both differential bevel gears (102) on this sphere can be examined. This is often referred to as spherical section.

The differential bevel gears (102) have a truncated cone shape at their base. A truncated cone is a rotational body based on a circular cone, wherein the circular cone is cut off parallel to the base surface (116). Therefore, the truncated cone has two circular surfaces and a lateral surface (114). In the following, the larger of the two circular surfaces is referred to as base surface (116) while the smaller of the two circular surfaces is referred to as top surface (118). A toothed section (120) is formed on the lateral surface (114). Thus, the differential bevel gears (102) have an external toothing (122).

In the embodiment example shown in FIG. 1, the equalizing bevel gear (104) has 10 teeth, and in the embodiment of example shown in FIG. 1, the axle shaft gear (106) has 14 teeth. In embodiments not shown specifically, the number of teeth≥9 is possible for the equalizing bevel gear (104), and the number of teeth≥13 is possible for the axle shaft gear (106).

Both differential bevel gears (102) each have a head height coefficient of at least 1.1.

Figure 2:
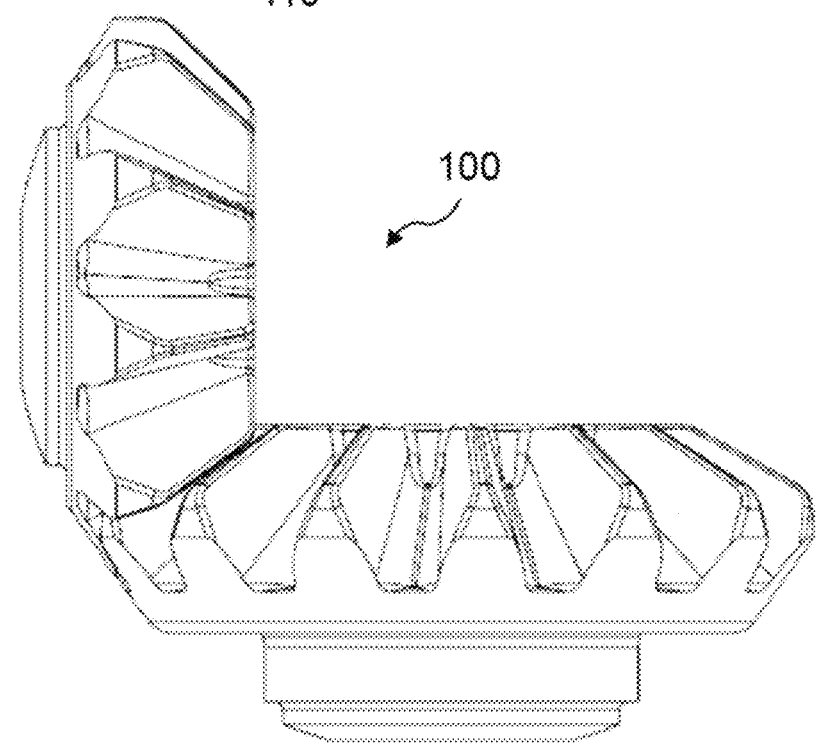
FIG. 2 a side view of a bevel gear differential according to an embodiment of the present disclosure.

FIG. 2 shows a side view of the bevel gear differential shown in FIG. 1.

Figure 3:
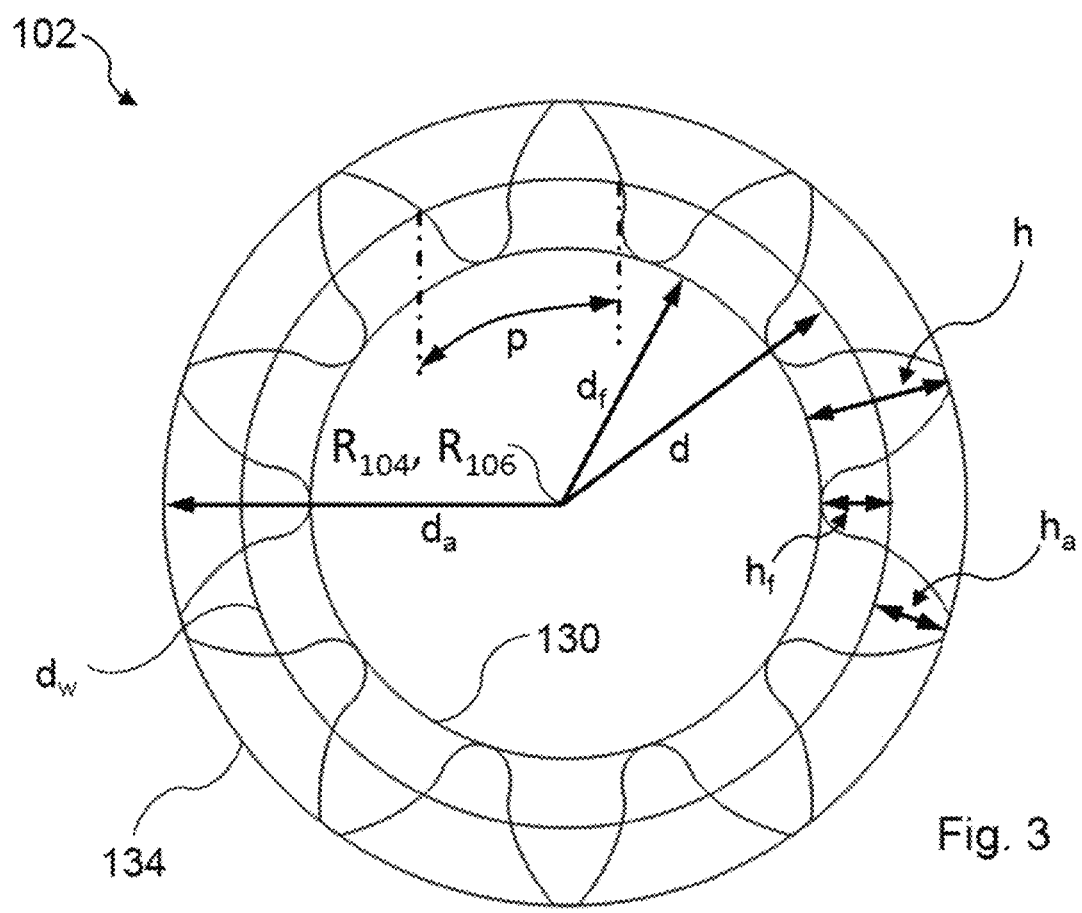
FIG. 3 a schematic sectional view of a differential bevel gear according to an embodiment of the present disclosure.

FIG. 3 shows a schematic sectional view of a differential bevel gear (102) according to an embodiment of the present disclosure. In the illustration, the most important dimensions and their locations are shown. The foot circle (130) is shown with the foot circle diameter ($d_f$), the pitch circle (132) is shown with the pitch circle diameter (d), and the head circle (134) is shown with the head circle diameter ($d_a$), wherein only half the diameter, meaning the radius, is shown from the center point to the corresponding circle as an arrow. The pitch circle is also referred to as a rolling circle with the rolling circle diameter ($d_w$). The tooth height (h) extends from the foot circle to the head circle, the head height ($h_a$) extends from the pitch circle to the head circle, the foot height ($h_f$) extends from the foot circle to the pitch circle.

The pitch (p) is defined as the arc length on the pitch circle (132) between two equal points on the pitch circle (132) of two adjacent teeth (108). The pitch (p) is also referred to as tooth pitch or circumferential pitch. The pitch (p) is thus the arc measure from tooth center to tooth center of the succeeding teeth of a toothed gear. In the pitch (p), the ratio of circumference and diameter (d) on the pitch circle (132) is factored in using the circle number ($\pi$). The module (m) characterizes similar differential bevel gears and is generally given in millimeters. The module (m) refers to the ratio of pitch circle diameter (d) to the number of teeth (z). The product of module (m) and ($\pi$) is referred to as pitch (p). The pitch (p) is also the sum of the gap width (e) between two teeth (108) and the tooth thickness(s)—both of which are measured on the pitch circle (132).

The head height coefficient ($h_a^*$) is defined as the ratio of the head height ($h_a$) of the teeth (108) to the pitch (p) of the toothed gear (102). The head height coefficient ($h_a^*$) is at least 1.1 in the shown embodiment example. As explained above, the head height coefficient can be at least 1.2 or 1.25. Furthermore, the head height coefficient can be no more than 1.9, or no more than 1.6, or no more than 1.5, or no more than 1.4. In a specific embodiment example, the head height coefficient can be in a range between 1.2 and 1.5 or in a range between 1.25 and 1.4.

The profile shift (V) for toothed gears is generally given by a profile shift coefficient (x) with respect to the module (m). For positive coefficients (x>0), the tool profile is shifted to the outside, and for negative coefficients (x<0), the tool profile is shifted to the inside (this is applicable for external toothing). A profile shift coefficient such as x=+0.25 clearly means that the tool profile is shifted to the outside by 0.25 times the module. This generally increases both the foot circle radius and the head circle radius corresponding to the amount of profile shift.

Figure 4:
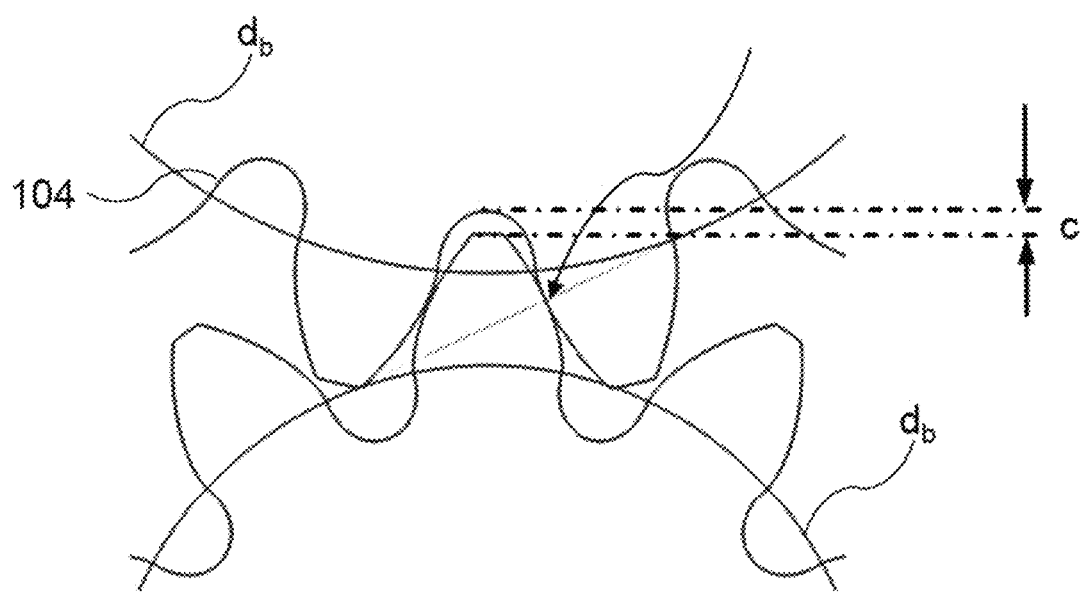
FIG. 4 a cutaway of a schematic sectional view of two mutually mating differential bevel gears according to an embodiment of the present disclosure.

FIG. 4 shows a cutaway view of a schematic sectional view of two mutually mating differential bevel gears (102). Here, the head clearance (c) can be seen clearly as the distance between the head circle (134) of one differential bevel gear (102) and the foot circle (130) of the other differential bevel gear (102).

Figure 5:
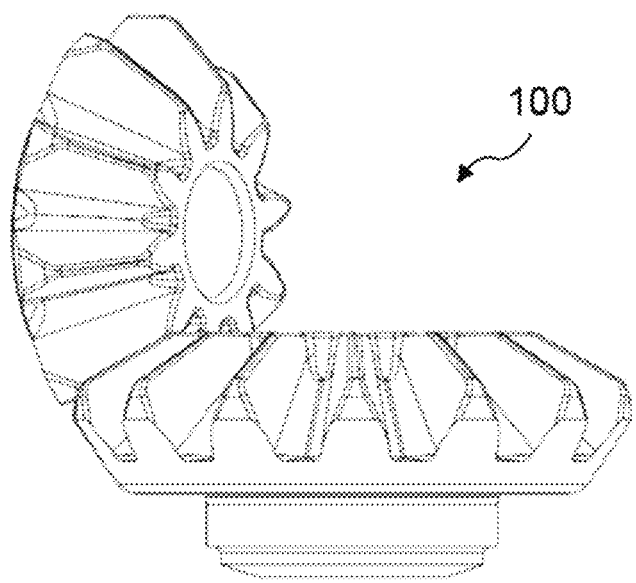
FIG. 5 a spatial view of a bevel gear differential according to an embodiment of the present disclosure.

The illustration in FIG. 5 shows the bevel gear differential (100) that has already been shown in FIG. 1 and FIG. 2, where in comparison to FIG. 2, the bevel gear differential (100) is shown rotated about the axis of rotation ($R_{106}$) of the axle shaft gear (106).

Figure 6:
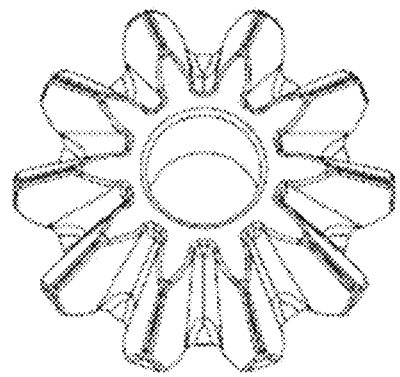
FIG. 6 a spatial view of a differential bevel gear according to an embodiment of the present disclosure.

FIG. 6 shows an equalizing bevel gear (104) as an example of a differential bevel gear (102).

Figure 7:
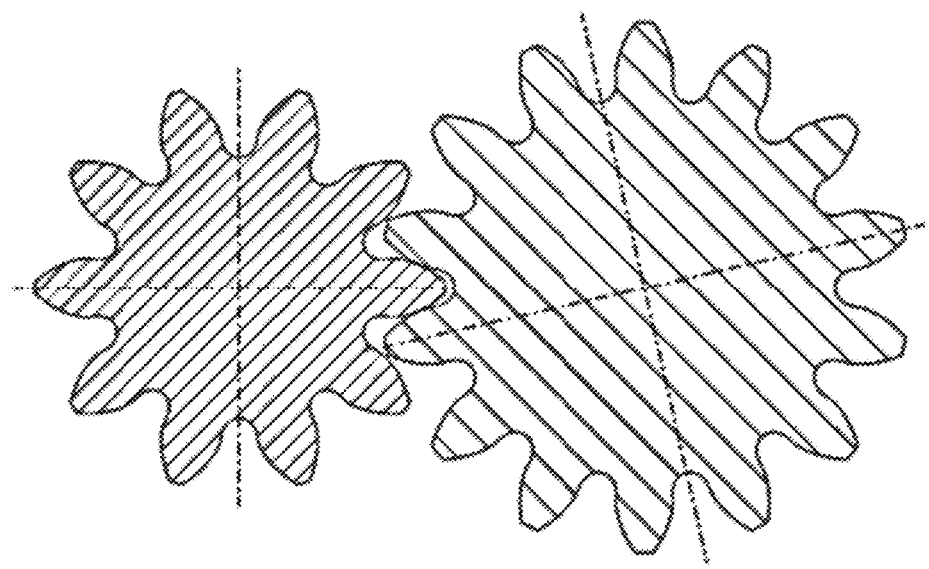
FIG. 7 a spherical section of a bevel gear differential according to an embodiment of the present disclosure.

FIG. 7 shows a spherical section of the bevel gear differential (100).

Figure 8:
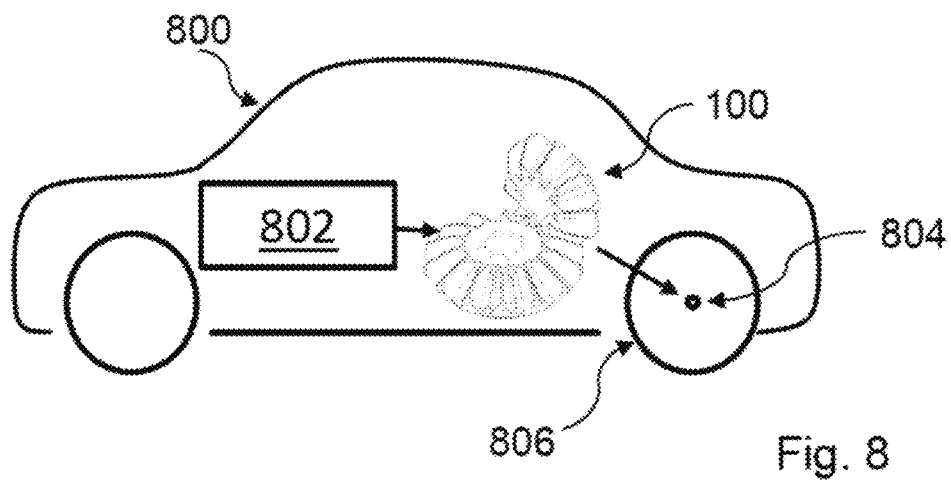
FIG. 8 a schematic illustration of a vehicle with a bevel gear differential according to an embodiment of the present disclosure.

FIG. 8 shows a schematic illustration of a vehicle (800) with a motor (802) of which the rotational movement is transmitted via a bevel gear differential (100) to an axle (804) and thus to the gears (806).

Figure 9:
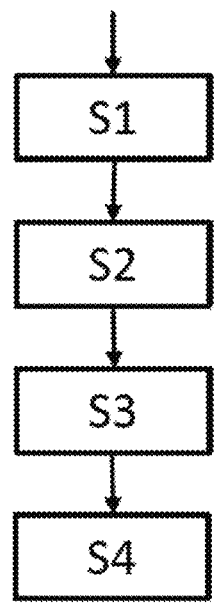
FIG. 9 a flow chart of a method according to the disclosure in accordance with an embodiment of the present disclosure.

FIG. 9 shows a flow chart of a method for the production of a differential bevel gear (102) using forming technology, especially suitable for a bevel gear differential (100) in a vehicle (800). The method has a step (S1) of providing a preform. The preform may be, for example, a section of round material. In a step (S2) of heating, the preform is heated to a temperature between 650° C. and 1250° C. The step (S2) of heating may be conducted inductively. Both steps (S1 and S2) may also be combined in one embodiment example, so that a round material is heated and only after the round material has been heated, a section of the heated round material may be, for example, sheared off to create the preform. In the subsequent step (S3) of bulk forming, the preform is molded to form a differential bevel gear (102), wherein the teeth (108) of the differential bevel gear (102) have a head height coefficient of at least 1.1. In a last step (S4), the differential bevel gear (102) is cooled down.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCE DESIGNATIONS 100 bevel gear differential
102 differential bevel gear
104 equalizing bevel gear
106 axle shaft gear
108 tooth
110 tooth flank
112 point of intersection
114 lateral surface
116 base surface
118 top surface
120 toothed section 122 external toothing
130 foot circle
132 pitch circle
134 head circle
800 vehicle
802 motor
804 axle
806 gears
$R_{104}$, $R_{106}$ axle of rotation
α angle of intersection
c head clearance
d pitch circle diameter
$d_a$ head circle diameter
$d_b$ base circle diameter
$d_f$ foot circle diameter
$d_w$ rolling circle diameter
h tooth height or tooth depth
$h_a$ head height or addendum
$h_f$ foot height or dedendum
m module (given in mm)
p pitch (on the pitch circle)
z number of teeth
x profile shift coefficient
V=x*m profile shift
$h^*_a$ head height coefficient
S1-S4 method steps

What is claimed is:

1. A vehicle differential bevel gear comprising:
a cone-shaped toothed section including external toothing with a plurality of teeth having a head height coefficient defined as a ratio between a head height of the teeth and a pitch of the differential bevel gear of at least 1.1, wherein the differential bevel gear comprises a foot height coefficient in a range from 1.1 to 2.0 such that the foot height coefficient is greater than the head height coefficient.

2. The differential bevel gear of claim 1, wherein the head height coefficient is at least 1.15.

3. The differential bevel gear of claim 1, wherein the differential bevel gear comprises a pressure angle in a range between 17° and 24°.

4. The differential bevel gear of claim 1, wherein the differential bevel gear comprises a profile shift coefficient between 0.1 and 0.3.

5. The differential bevel gear of claim 1, wherein the external toothing is a forming-process-toothing free of post-machining.

6. The differential bevel gear of claim 1, wherein a spherical involute of the differential bevel gear is modified in the profile direction and/or width direction.

7. A vehicle bevel gear differential comprising:
a first differential bevel gear molded as an equalizing bevel gear comprising an external toothing including teeth having a head height coefficient of at least 1.1, and the differential bevel gear comprises a foot height coefficient in a range from 1.1 to 2.0 such that the foot height coefficient is greater than the head height coefficient; and
a second differential bevel gear mating with the equalizing bevel gear, the second differential bevel gear being molded as an axle shaft gear comprising teeth having a head height coefficient of at least 1.2,
a total coverage of the equalizing bevel gear and the axle shaft gear being in a range of 1.5 to 2.0.

8. The bevel gear differential of claim 7, wherein the total coverage of the equalizing bevel gear and axle shaft gear, when subjected to a load, is in a range from 1.6 to 1.9.

9. The bevel gear differential of claim 7, wherein the equalizing bevel gear has a profile shift coefficient between 0.1 and 0.3.

10. The bevel gear differential of claim 7, wherein the axle shaft gear has a negative profile shift coefficient.

11. A method of producing a vehicle differential bevel gear, the method comprising:
providing a preform comprising a section of a round material;
inductively heating the preform to a temperature between 650° C. and 1250° C.;
bulk forming of the preform to form a differential bevel gear having a cone-shaped toothed section comprising external toothing with a plurality of teeth having a head height coefficient of at least 1.1, wherein the differential bevel gear comprises a foot height coefficient in a range from 1.1 to 2.0 such that the foot height coefficient is greater than the head height coefficient; and
cooling of the differential bevel gear.

12. The method of claim 11, wherein the preform includes steel, the method further comprising heating the preform to a temperature below recrystallization and below austenite transformation temperature of steel in the heating step.

13. The method of claim 11, further comprising cooling down the differential bevel gear in a regulated manner and/or quenched from the forging heat in the cooling step.

14. The method of claim 11, further comprising sandblasting and/or calibrating the differential bevel gear after the bulk forming step.

* * * * *